Jan. 8, 1935. K. C. KLEIMENHAGEN 1,987,148
PROCESS OF MANUFACTURING QUINHYDRONE
Filed Feb. 19, 1934
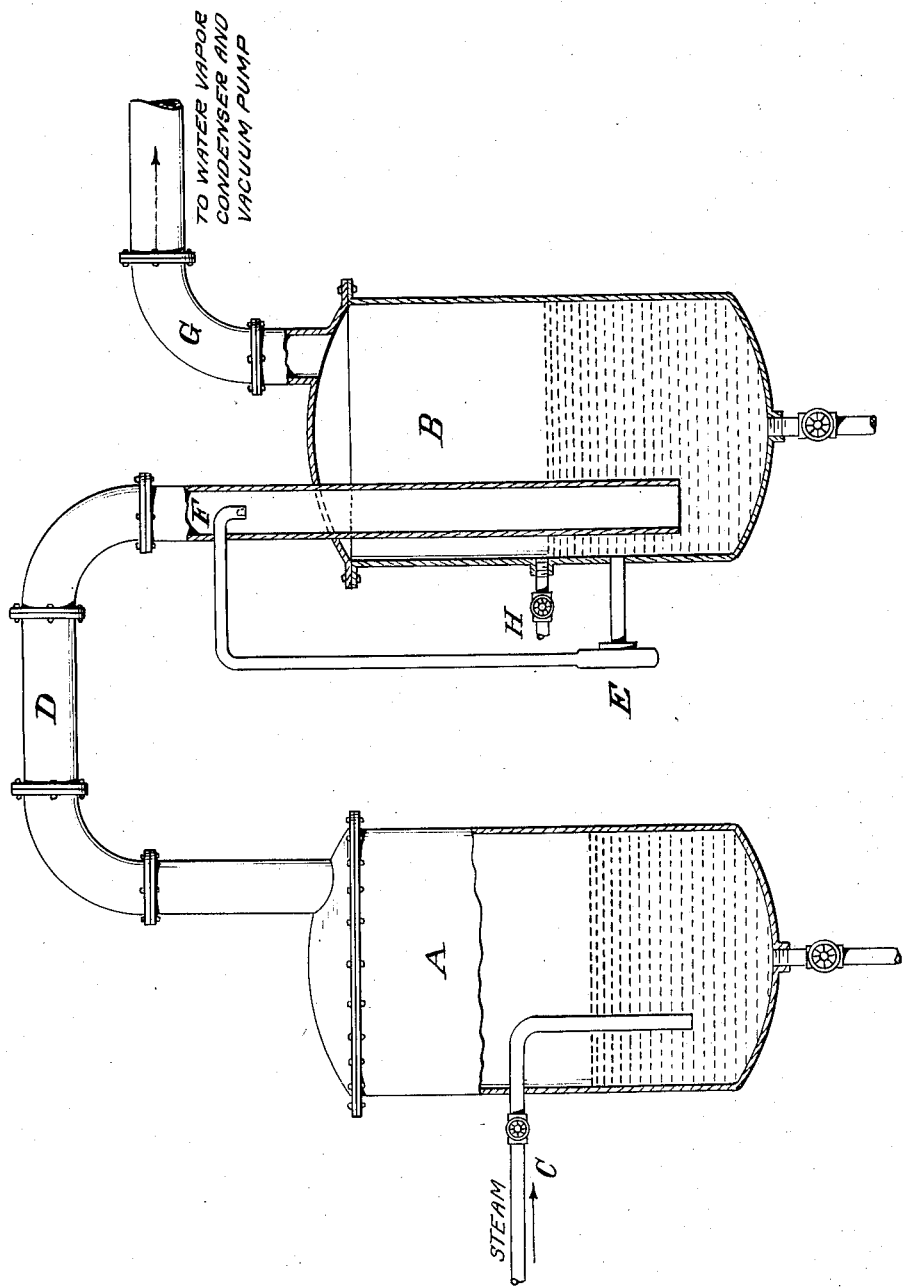
Inventor
KARL C. KLEIMENHAGEN
By Smith, Michael and Gardiner
Attorneys Patented Jan. 8, 1935

1,987,148

UNITED STATES PATENT OFFICE 1,987,148

PROCESS OF MANUFACTURING QUINHYDRONE

Karl Christian Kleimenhagen, La Salle, Ill., assignor to Carus Chemical Co., Inc., La Salle, Ill.

Application February 19, 1934, Serial No. 712,034

10 Claims. (Cl. 260—56)

This invention relates to the commercial production of quinhydrone. While this compound has various uses, such as a mordant for silk, it is of primary importance because of the fact that it is a very desirable and convenient compound from which hydroquinone can be made (see patents to Hermann Emde 1,532,800 and 1,540,738), and hydroquinone has acquired an important status in the photographic industry, as a photographic developer.

In general, quinhydrone is produced by the reduction of quinone with a suitable reducing agent or by allowing solutions of quinone and hydroquinone to react, forming quinhydrone by single addition of these two compounds. It may, for the sake of convenience, also be prepared by the oxidation of hydroquinone. This is the usual method for making small quantities, but since hydroquinone is made by the reduction of quinone or quinhydrone itself, this method is of little commercial importance.

While quinone can be reduced directly to hydroquinone, the production of a pure quinone, as will hereinafter be related, is difficult.

The general, well-known method for producing quinone is by the oxidation of aniline in an aqueous sulfuric acid solution with either manganese dioxide or sodium dichromate at temperatures below 6° centigrade.

One of the methods of separation of the quinone from the oxidation mixture is by extraction with a solvent, as for example, ether. This method, however, is not satisfactory as the solvent and aqueous portions do not separate in satisfactory layers. Several extractions must be made. This process is long, tedious, and there are also the usual solvent hazards as well as losses.

Another method is to heat the oxidation mixture with or without the addition of water so as to dissolve the quinone. The insoluble impurities are then filtered off and the quinone allowed to crystallize out. The yields, however, are poor due to decomposition of quinone at the higher temperatures and the obnoxious quinone fumes given off make this method very unsatisfactory.

When a crude quinone oxidation liquid is heated, strong quinone vapors are evolved. Even at temperatures considerably below the boiling point, the quinone is given off at such a copious rate that the cooling fumes above the liquid condense in a snow cloud of quinone. This property is the source of still another method of obtaining a pure quinone, namely, by distillation. This method is given in laboratory manuals. However, when the crude quinone solution is heated to its boiling point, the quinone therein is rapidly decomposed and the yields obtained are poor. The yields, however, can be improved by heating small amounts of the solution rapidly and allowing the quinone to distill off in a short period of time.

According to Erlach (Austrian Patent No. 98418), quinone can be successfully distilled under vacuum, thus avoiding the necessity of heating the crude quinone liquors to a temperature where rapid decomposition takes place. While the temperatures of distillation are not mentioned in this patent, by heating a crude oxidation mixture containing the crude quinone, the temperatures at which the rate of decomposition becomes excessive can be readily determined. It is thus found that a suitable temperature is approximately 65° centigrade where the time of distillation is of short duration. When the distillation takes longer than approximately a half hour, it is preferable to distill at lower temperatures.

Thus, while the distillation of the quinone can be carried on quite satisfactorily, the problem of condensing the quinone is a difficult one due to its low solubility.

When it is attempted to condense the mixture of quinone and water vapor in the usual water jacketed tube condenser, the tube soon becomes clogged with quinone crystals. If the vapors are conducted into a body of liquid in a receiver and the liquid kept cool by a cooling coil, the liquid soon becomes saturated and the coil coats over with quinone crystals which here again act as an insulator, making further cooling difficult and inefficient. The liquid becomes warm and quinone is lost through decomposition and volatilization. Instead of attempting to keep the water cool with a cooling coil, sufficient cold liquid or ice could be added. This, however, gives a large volume of liquid resulting in a loss of quinone in the mother liquor or making a solvent extraction necessary. It is thus seen that the usual methods of preparing a pure quinone for the further use of preparing either quinhydrone or hydroquinone are difficult and not satisfactory.

My invention consists in producing quinhydrone in an easy, simple and efficient manner by condensing the quinone vapors and immediately converting the quinone into quinhydrone and cooling the resulting quinhydrone solution, with or without quinhydrone crystals suspended therein, without an appreciable loss of quinone. This method is explained with the assistance of the accompanying diagram. A is a vessel containing the crude or commercial solution of quinone known to the trade as the "oxidation mixture" which may be heated with live steam entering through pipe C. When the quinone liquid becomes sufficiently heated, water and quinone vapors rise and enter the vapor pipe D. While the method of production of the quinone vapor is immaterial to this invention, this method of producing such vapor is merely given for the sake of illustration, and the quinone vapors might be formed in any other suitable apparatus. B is a closed receiving vessel partly filled with a strong aqueous solution of hydroquinone. The solution should be concentrated but somewhat below the saturation point to prevent crystallization. The vapor pipe D enters the receiver and terminates at a distance below the level of the hydroquinone solution. This distance varies according to the absolute pressure that is to be maintained in vessels A and B. E is a circulating pump of sufficient size that pumps the hydroquinone solution into the downcoming vapor pipe through a suitable spray nozzle F, which nozzle is at such a distance above the outlet of the vapor pipe that the quinone vapors will be practically all condensed by the circulating hydroquinone solution. G is an exhaust water-vapor pipe connected to a standard suitable water vapor condenser and vacuum pump. H is a pipe connection through which the hydroquinone solution enters the receiver B.

Having now described the essence of the apparatus, I will now describe the principle of its operation.

Crude quinone liquid containing, for example, 100 pounds of quinone is pumped into the vessel A and a solution of hydroquinone containing at least 100 pounds of hydroquinone, but preferably 200 pounds, is added to the receiver B and sufficient water added so that, in this particular example, the outlet of the vapor pipe will be approximately two feet below the surface of the liquid. The receiver is then put under a vacuum of 27½ inches of mercury. Due to the fact that the outlet of the vacuum pipe is approximately two feet below the surface of the liquid, the vacuum in vessel A will be approximately 25½ inches. The circulating pump E is now started and the crude quinone liquid heated. When the temperature reaches around 54° centigrade the liquid will start to boil. The vapors at about approximately this temperature enter the vapor pipe and are condensed by the spray of cool hydroquinone liquid entering the vapor pipe through nozzle F. The condensed quinone combines immediately with the hydroquinone to form quinhydrone and falls into the liquid in the receiver. The solution in the receiver gradually warms up until it reaches the boiling point corresponding to the vacuum maintained in the receiving vessel. The temperature in this particular example would be approximately 42° centigrade. When this temperature is reached, it also starts to boil and the temperature will not rise appreciably higher as long as the vacuum is maintained. The vapors rising from the solution are water vapors practically free from quinone. The volume of the solution in the receiver will also not appreciably change since the water is boiled off at nearly the same rate at which the water vapors come over from the vessel A. Since quinhydrone is only slightly soluble at this temperature, quinhydrone crystals form in the receiver, but these being very small and light in weight, do not interfere with the pump or the working of the system but circulate freely with the liquid. When the distillation is complete the contents of the receiver may be run on a filter and the quinhydrone crystals separated from the mother liquid with ease, washed and dried in the usual manner, or reduced to hydroquinone by any of the well known means, or it may be reduced in the receiver itself to hydroquinone by a method similar to that of Emde in Patent 1,540,738. The yield of quinhydrone is almost theoretical when based on the quantity of quinone entering the vapor pipe.

The above is merely an example showing the operation of my invention and I do not limit my invention to the above temperatures and pressures, but it is desirable to maintain such a vacuum in the receiver as to prevent the temperature of solution therein from rising above 65° centigrade. For example, the distillation in vessel A may take place at atmospheric pressure and at a temperature of around 100° centigrade and a vacuum of 29 inches of mercury with a corresponding temperature of approximately 25° centigrade may be maintained in the receiver. This can be accomplished by having the outlet of the vapor pipe at a sufficient distance below the top level of the liquid in the receiver, which distance can be readily determined.

The absolute pressure in vessel B must always be less than the absolute pressure in vessel A in order that the solution in vessel B will always be kept at a temperature below that of the quinone vapor.

It is known that when a solution of quinhydrone is boiled under atmospheric conditions, the quinhydrone dissociates into quinone and hydroquinone, the quinone volatilizing therefrom. It could not be foreseen, however, that when a solution of quinhydrone or a solution of hydroquinone with quinhydrone therein could be left boiling under a reduced pressure at temperatures below approximately 65° centigrade, the loss of quinone therefrom would be at a negligible rate.

I claim as my invention:

1. The process of making quinhydrone which comprises condensing quinone vapors with a solution of hydroquinone at a substantially lower temperature.

2. The process of making quinhydrone which comprises condensing quinone vapors by contacting said vapors with a solution of hydroquinone, which solution is kept below 65 degrees C. by subjecting it to a vacuum greater than 22½ inches of mercury.

3. The process of making quinhydrone which comprises condensing quinone vapors by contacting said vapors with a solution of hydroquinone which solution is at a lower temperature than the quinone vapor and not exceeding 65° centigrade.

4. The process of making quinhydrone which comprises condensing quinone vapors with a recirculating hydroquinone solution, which solution contains an excess of hydroquinone above that required to react with the amount of quinone in the vapor and which solution is kept at a temperature below that of the quinone vapor by subjecting it to a vacuum greater than 22½ inches of mercury.

5. The process of concentrating a quinhydrone solution without appreciable loss of quinone therefrom comprising boiling said solution at a temperature below 65° C. and under a vacuum greater than 22½ inches of mercury.

6. The process of producing quinhydrone which comprises steam distilling an oxidation mixture of quinone, and condensing said vapors by contact with a solution of hydroquinone, and maintaining the temperature of said solution within the temperature range at which the quinone vapors are substantially stable.

7. The process of producing quinhydrone which comprises steam distilling an oxidation mixture of quinone, condensing said vapors by contact with a solution of hydroquinone at a temperature below 65 degrees C. and collecting the crystals of quinhydrone so formed in the hydroquinone solution.

8. The process of making quinhydrone comprising condensing quinone vapors with a solution of hydroquinone and maintaining the temperature of said solution within the temperature range at which the quinone vapors are substantially stable.

9. The process of making quinhydrone which comprises condensing quinone vapors with a solution of hydroquinone and maintaining the temperature of said solution appreciably below that of the vapors by keeping said solution under a suitable vacuum.

10. The process of making quinhydrone which comprises condensing quinone vapor with a solution of hydroquinone and maintaining the boiling point of the solution within predetermined limits by subjecting the solution to vacuum greater than twenty-two and one-half inches of mercury.

KARL CHRISTIAN KLEIMENHAGEN.